(12) United States Patent
McGuire et al.

(10) Patent No.: US 11,046,258 B2
(45) Date of Patent: Jun. 29, 2021

(54) METHODS OF VISUALLY CHECKING FOR ALIGNMENT BETWEEN INSTRUMENT PANEL ORNAMENTS AND DOOR ORNAMENTS USING ALIGNMENT TOOLS

(71) Applicant: Toyota Motor Engineering & Manufacturing North America, Inc., Plano, TX (US)

(72) Inventors: Andrew Ivor McGuire, Lexington, KY (US); Stephen David Hitchcock, Lexington, KY (US); Tammy Michelle Foley, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 153 days.

(21) Appl. No.: 16/545,080

(22) Filed: Aug. 20, 2019

(65) Prior Publication Data

US 2021/0053508 A1    Feb. 25, 2021

(51) Int. Cl.
*B60R 13/02*    (2006.01)
*B62D 65/14*    (2006.01)

(52) U.S. Cl.
CPC .......... *B60R 13/0243* (2013.01); *B62D 65/14* (2013.01); *B60R 2013/0293* (2013.01)

(58) Field of Classification Search
CPC ........ B60R 13/0243; B60R 2013/0293; B62D 65/14
USPC ....................................................... 296/146.7
See application file for complete search history.

(56) References Cited

U.S. PATENT DOCUMENTS

| | | | | |
|---|---|---|---|---|
| 4,784,911 | A | * | 11/1988 | Gembinski ............. B29C 41/22 427/180 |
| 6,946,182 | B1 | * | 9/2005 | Allgeuer ............... B29C 43/222 264/134 |
| 10,259,401 | B2 | | 4/2019 | Tawada et al. |
| 2017/0267189 | A1 | * | 9/2017 | Hirose ................ B60R 13/0243 |
| 2018/0290603 | A1 | * | 10/2018 | Gillay .................... B60J 5/0413 |
| 2021/0061073 | A1 | * | 3/2021 | Dominguez Cuevas ..................... B60J 5/0469 |

FOREIGN PATENT DOCUMENTS

| | | |
|---|---|---|
| CN | 102564943 A | 7/2012 |
| CN | 208833585 U | 5/2019 |
| JP | 2015182647 a * | 3/2014 |
| JP | 6100190 U | 3/2017 |
| KR | 20080058604 A | 6/2008 |
| WO | 2008006184 A1 | 1/2008 |

* cited by examiner

*Primary Examiner* — Pinel E Romain
(74) *Attorney, Agent, or Firm* — Dinsmore & Shohl LLP

(57) ABSTRACT

A method of visually checking for alignment between an instrument panel ornament and a door ornament is provided. The method includes locating an enlarged head portion of an alignment tool on a top edge of the instrument panel ornament. The enlarged head portion includes a side measurement feature with a height for checking for a misalignment condition between the instrument panel ornament and the door ornament. It is determined whether a top edge of the door trim ornament is located within the height of the side measurement feature with the enlarged head portion resting on the top edge of the instrument panel ornament.

12 Claims, 4 Drawing Sheets

METHODS OF VISUALLY CHECKING FOR ALIGNMENT BETWEEN INSTRUMENT PANEL ORNAMENTS AND DOOR ORNAMENTS USING ALIGNMENT TOOLS

TECHNICAL FIELD

The present specification generally relates to installation of vehicle ornaments and, more specifically, methods of visually checking for alignment between an instrument panel ornament and a door ornament using alignment tools.

BACKGROUND

Vehicle door assemblies include interior panels that are used to cover the vehicle door and provide various features and also a visually acceptable appearance within the vehicle. Some of these vehicle door assemblies include ornamental features that enhance the appearance of the interior panels. Similarly, instrument panel assemblies may also have ornamental features that enhance the appearance of the instrument panels. For some vehicles, it may be desirable for there to be alignment between the ornamental features of the instrument panels and the vehicle door assemblies.

Accordingly, a need exists for methods of visually checking for alignment between an instrument panel ornament and a door ornament using alignment tools.

SUMMARY

In one embodiment, a method of visually checking for alignment between an instrument panel ornament and a door ornament is provided. The method includes locating an enlarged head portion of an alignment tool on a top edge of the instrument panel ornament. The enlarged head portion includes a side measurement feature with a height for checking for a misalignment condition between the instrument panel ornament and the door ornament. It is determined whether a top edge of the door trim ornament is located within the height of the side measurement feature with the enlarged head portion resting on the top edge of the instrument panel ornament.

In another embodiment, a method of visually checking for alignment between an instrument panel ornament and a door ornament is provided. The method includes locating a side measurement feature of an enlarged head portion of an alignment tool alongside a side edge of the instrument panel ornament. The side measurement feature having a height for checking for a misalignment condition between the instrument panel ornament and the door ornament. If a top edge of the door ornament is located outside the height of the side alignment feature, changing a position of the door ornament.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
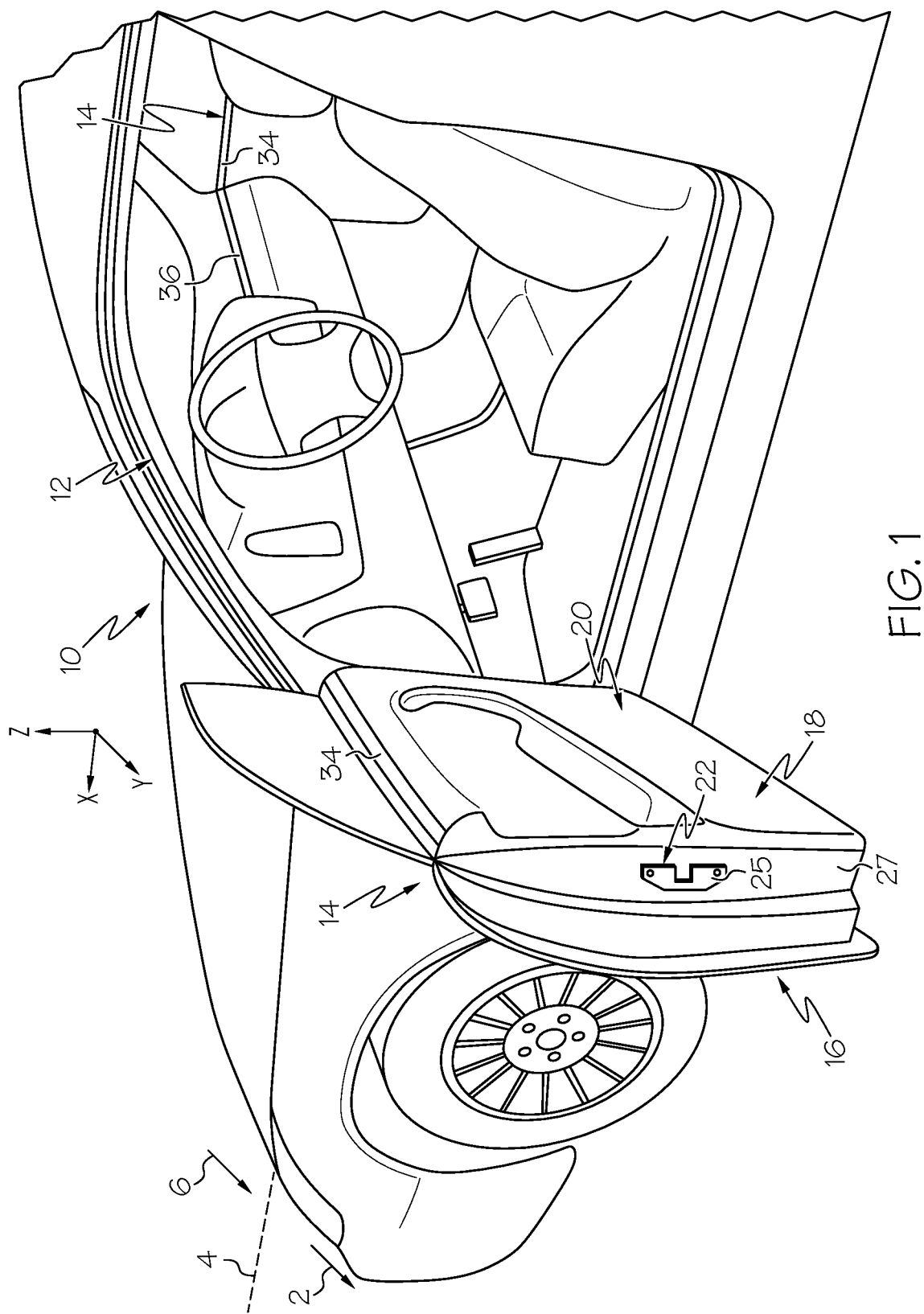
FIG. 1 is a perspective view of a vehicle including a door trim ornament and an instrument panel ornament, according to one or more embodiments shown and described herein.

Embodiments described herein are generally related to door assemblies for vehicles that include interior panels and a door ornament that extends longitudinally across at least a portion of the interior panels with the door assemblies in a closed position. The vehicles further include instrument panels that include an instrument panel ornament that extends laterally across at least a portion of the instrument panels. Upon assembly, it may be desired that the door ornament and the instrument panel ornament are horizontally aligned to provide an appearance of continuity between the door ornament and the instrument panel ornament. To this end, an alignment tool is provided that can be used to visually check for alignment between the instrument panel ornament and the door ornament. The alignment tool includes a handle and an enlarged head portion that includes a side feature with a height for checking for a misalignment condition between the instrument panel ornament and door ornament As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

In FIG. 1, selected portions of the vehicle 10 are illustrated. The vehicle 10 generally includes a vehicle body 12 with a vehicle door 14. The vehicle door 14 may include an outer panel 16 and an inner panel 18 that is connected to the outer panel 16 to define a volume therebetween. The outer panel 16 may be an outer visible panel of the vehicle body 12 from outside the vehicle, while the inner panel 18 may be an interior door panel that is visible from inside the vehicle 10. A door latch assembly 22 may be located at least partially within the volume between the outer panel 16 and the inner panel 18 of the vehicle door 14. The door latch assembly 22 may include a door latch 25 that is located at a shut face panel 27 that is located between the outer panel 16 and the inner panel 18. While the driver side vehicle door 14 is illustrated, the passenger side vehicle door 14 may include the same or similar components as the driver side vehicle door 14. An instrument panel 30 extends in the vehicle lateral direction along a front of passenger cabin 32 and between the vehicle doors 14. The instrument panel 30 is a control panel located in front of of a vehicle driver that displays instruments and controls for vehicle operation.

Figure 2:
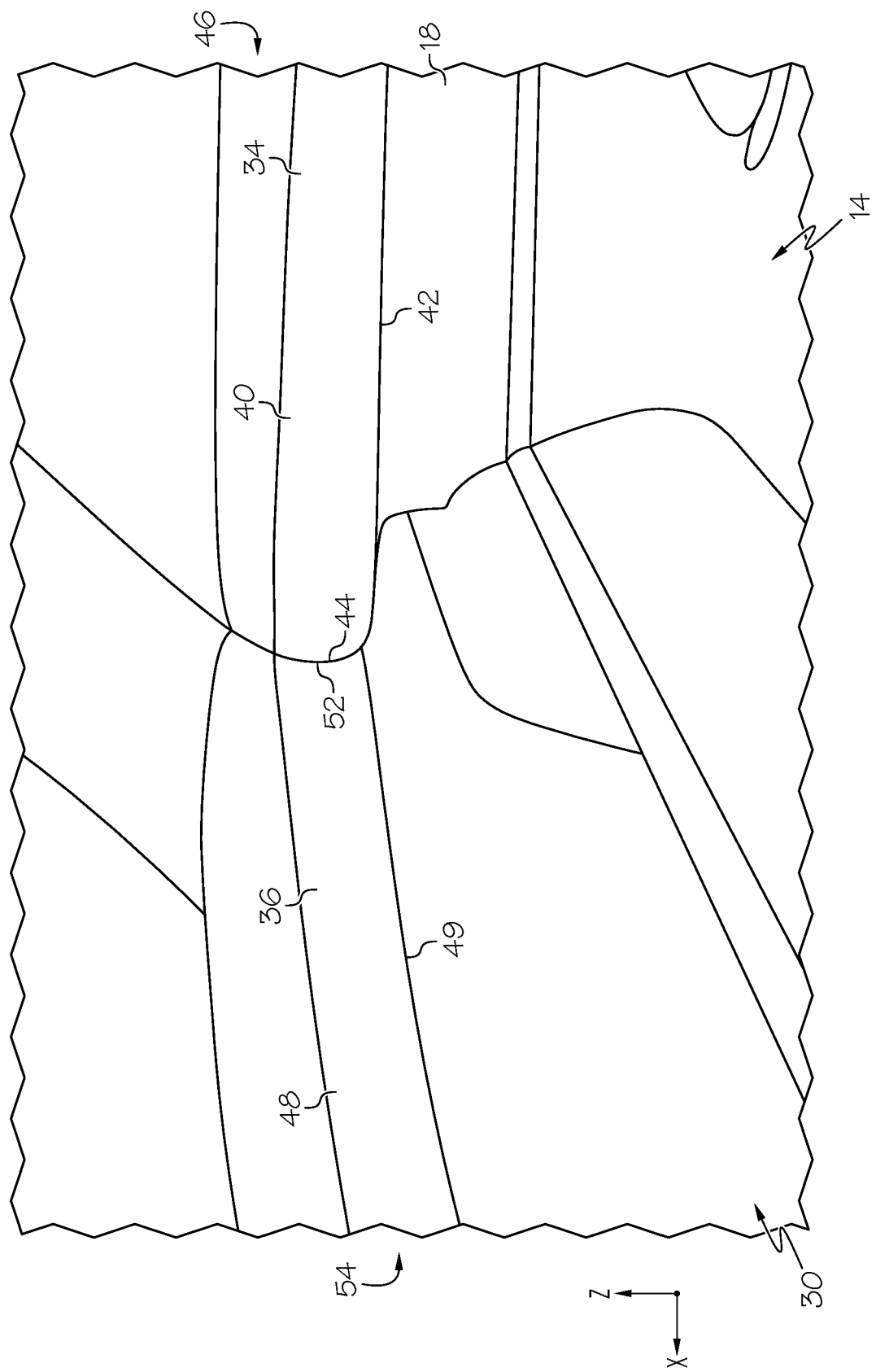
FIG. 2 is a detail view of an instrument panel ornament and door trim ornament, according to one or more embodiments shown and described herein.

Referring also to FIG. 2, at least one or both of the vehicle doors 14 may include a door ornament 34. The door ornament 34 may be formed of a rigid plastic material, metal, such as aluminum and/or wood and may include a decorative design, such as woodgrain to supplement an appearance of the inner panel 18. The door ornament 34 may extend in the vehicle longitudinal direction along the inner panel 18 and may be relatively long in the vehicle longitudinal direction and relatively narrow in the vehicle vertical direction.

The instrument panel 30 may include an instrument panel ornament 36. The instrument panel ornament 36 may be formed of a rigid plastic material, metal, such as aluminum and/or wood and may include a decorative design, such as woodgrain to supplement an appearance of the instrument panel 30. In some embodiments, the instrument panel ornament 36 and the door ornament 34 may be formed of the same materials. The instrument panel ornament 36 may extend in the vehicle lateral direction along the instrument panel 30 and may be relatively long in the vehicle lateral direction and relatively narrow in the vehicle vertical direction.

Referring to FIG. 2, the door ornament 34 includes a top edge 40, a bottom edge 42, a front edge 44 and a rear edge 46. Likewise, the instrument panel ornament 36 includes a top edge 48, a bottom edge 49 and side edges 52 and 54. As will be described in greater detail below, the top edges 40 and 48 of the door ornament 34 and the instrument panel ornament 36 are aligned horizontally (i.e., in the X-Y plane) to give an appearance of continuity between the door ornament 34 and the instrument panel ornament 36.

Figure 3:
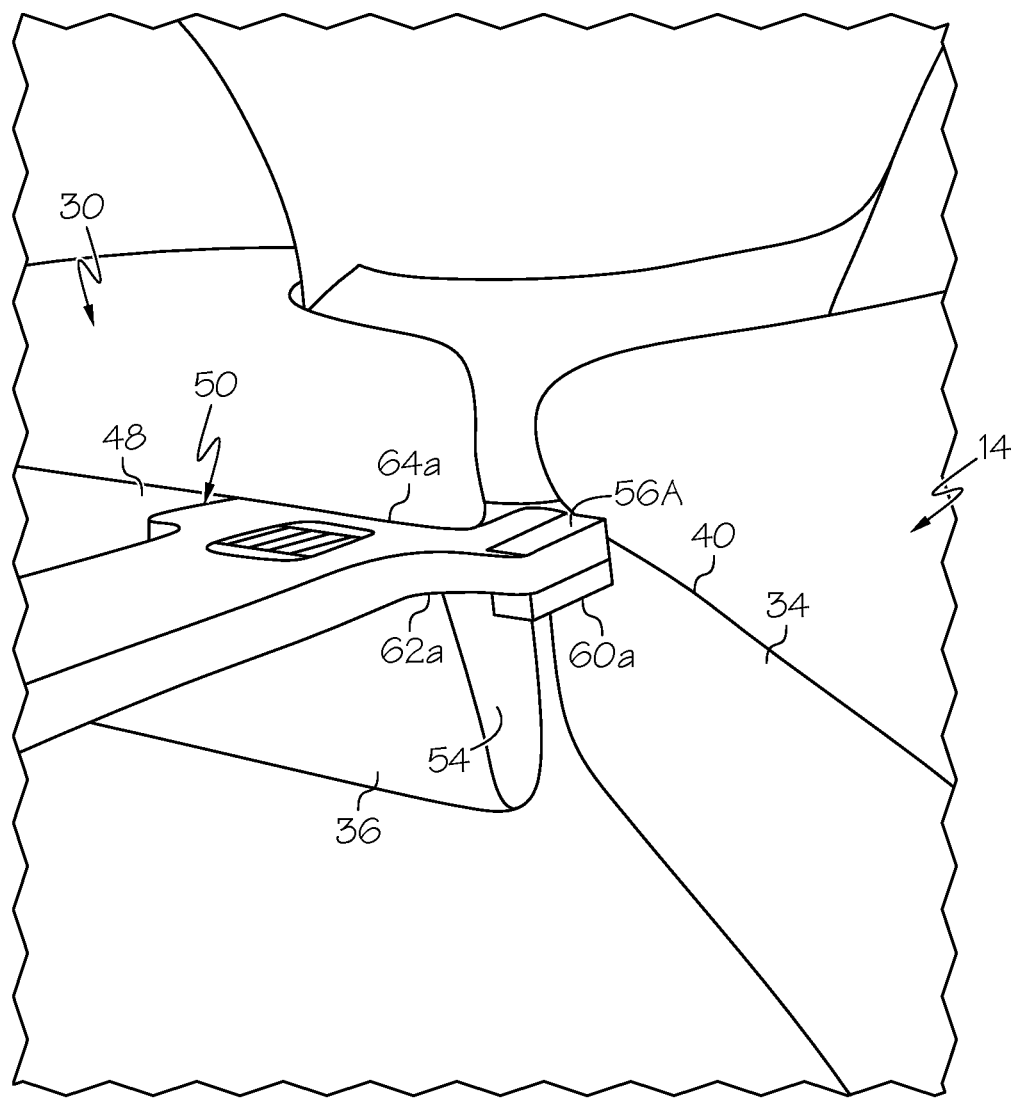
FIG. 3 illustrates a method of visually checking for alignment between an instrument panel ornament and a door ornament using an alignment tool, according to one or more embodiments shown and described herein.
Figure 4A:
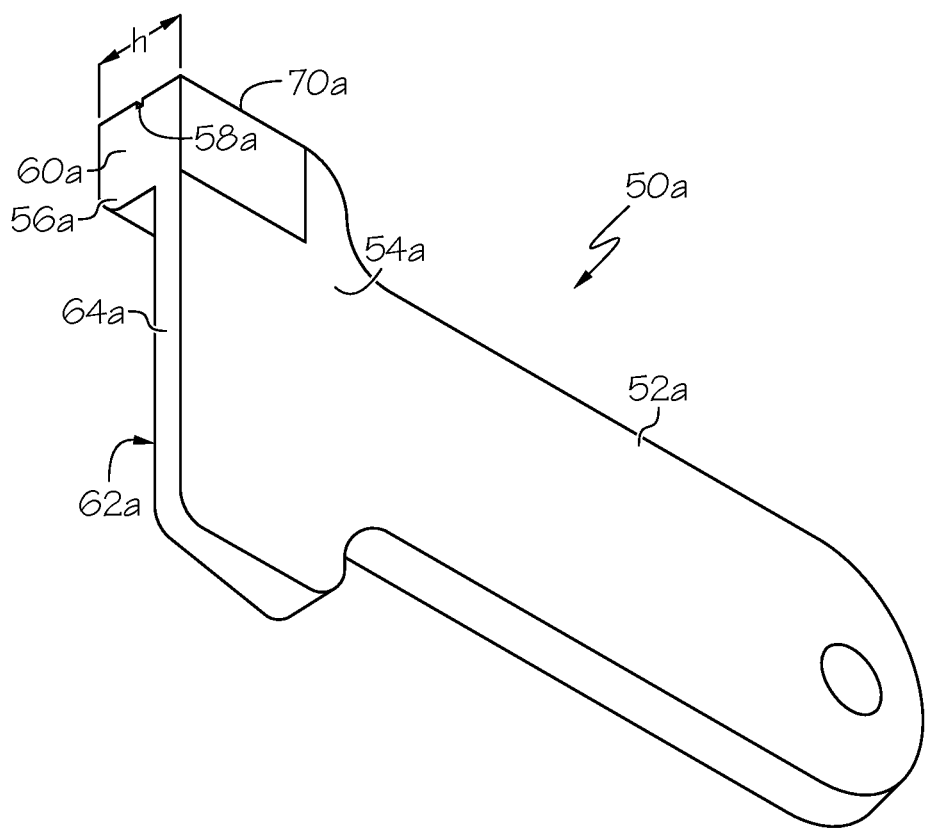
FIG. 4A illustrates an alignment tool for use at a right hand side of an instrument panel ornament, according to one or more embodiments shown and described herein.
Figure 4B:
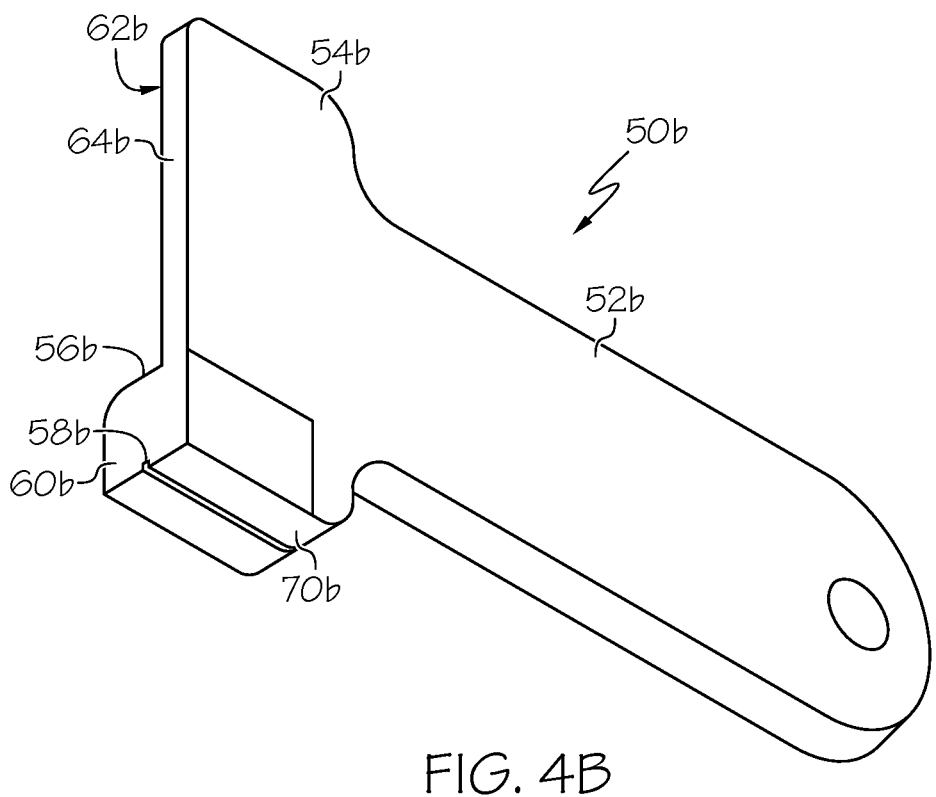
FIG. 4B illustrates an alignment tool for use at a left hand side of an instrument panel ornament, according to one or more embodiments shown and described herein.

Referring briefly to FIG. 3, an alignment tool 50 is used to visually determine whether a misalignment condition exists between the door ornament 34 and the instrument panel ornament 36. Referring to FIGS. 4A and 4B, the alignment tool 50a, 50b includes a handle 52a, 52b and an enlarged head portion 54a, 54b that extends outwardly from the handle 52a, 52b. that includes a side measurement feature 56a, 56b with a height h (e.g., between about 5 mm and about 10 mm, such as about 8 mm). The handle, 52a, 52b, enlarged head portion 54a, 54b and side measurement feature 56a, 56b may be a single piece, molded tool. In some embodiments, a notch 58a, 58b may be provided through a width of the side measurement feature 56a, 56b that marks a middle of the side measurement feature 56a, 56b. As can be seen, the side measurement feature 56a, 56b includes a projecting portion 60a, 60b that extends outwardly from a surface 62a, 62b at a terminal edge 64a, 64b of the alignment tool 50. The side measurement feature 56a, 56b is also located at a side edge 70a, 70b of the enlarged head portion 54a, 54b. The terminal edge 64a, 64b adjacent the side measurement feature 56a, 56b is relatively narrow compared to the side measurement feature 56a, 56b and flat in order to rest on the top edge 48 of the instrument panel ornament 36.

Referring again to FIG. 3, the terminal edge 64a is located on the top edge 48 of the instrument panel ornament 36 in a flat orientation such that the terminal edge 64 is parallel with the top edge 48. The projecting portion 60a extending from surface 62a extends alongside the side edge 54 of the instrument panel ornament 36. At this point, a visual inspection of the location of the top edge 40 of the door ornament 34 relative to the side measurement feature 56a is made. If the top edge 40 of the door ornament 34 is located within the height of the side measurement feature 56a, there is an alignment condition between the instrument panel ornament 36 and the door ornament 34. If the top edge 40 of the door ornament 34 is located outside the height of the side measurement feature 56a, there is a misalignment condition between the instrument panel ornament 36 and the door ornament 34.

The above-described methods and alignment tools allows for visual inspection of a position of a door ornament relative to an instrument panel ornament before installation of the ornaments is completed. The alignment tools are gages that are used to measure whether or not the position of the door ornament relative to the instrument panel ornament is within a preselected distance.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of visually checking for alignment between an instrument panel ornament and a door ornament, the method comprising:

locating an enlarged head portion of an alignment tool on a top edge of the instrument panel ornament, the enlarged head portion comprising a side measurement feature with a height for checking for a misalignment condition between the instrument panel ornament and the door ornament; and determining whether a top edge of the door trim ornament is located within the height of the side measurement feature with the enlarged head portion resting on the top edge of the instrument panel ornament.

2. The method of claim 1 comprising manually locating the enlarged head portion on the top edge of the instrument panel ornament using a handle connected to the enlarged head.

3. The method of claim 1, wherein the step of locating the enlarged head on the top edge of the instrument panel comprising positioning the side measurement feature alongside a side edge of the instrument panel ornament.

4. The method of claim 1, wherein the alignment tool in a single, molded part.

5. The method of claim 1, wherein the side measurement feature is located at a side edge of the enlarged head portion.

6. The method of claim 1, wherein the side measurement feature includes a notch located at one half the height of the side measurement feature.

7. A method of visually checking for alignment between an instrument panel ornament and a door ornament, the method comprising:

locating a side measurement feature of an enlarged head portion of an alignment tool alongside a side edge of the instrument panel ornament, the side measurement feature having a height for checking for a misalignment condition between the instrument panel ornament and the door ornament; and if a top edge of the door ornament is located outside the height of the side alignment feature, changing a position of the door ornament.

8. The method of claim 7 comprising manually locating the enlarged head portion on a top edge of the instrument panel ornament using a handle connected to the enlarged head.

9. The method of claim 8, wherein a terminal edge of the enlarged head is parallel with the top edge of the instrument panel.

10. The method of claim 7, wherein the alignment tool in a single, molded part.

11. The method of claim 7, wherein the side measurement feature is located at a side edge of the enlarged head portion.

12. The method of claim 7, wherein the side measurement feature includes a notch located at one half the height of the side measurement feature.

\* \* \* \* \*